(12) United States Patent
Gong

(10) Patent No.: US 11,459,060 B2
(45) Date of Patent: Oct. 4, 2022

(54) METHOD OF CONTROLLING AN ELECTROMECHANICAL DRIVE MECHANISM

(71) Applicant: EBIKE SYSTEMS LTD, London (GB)

(72) Inventor: Linan Gong, London (GB)

(73) Assignee: EBIKE SYSTEMS LTD, London (GB)

( * ) Notice: Subject to any disclaimer, the term of this patent is extended or adjusted under 35 U.S.C. 154(b) by 505 days.

(21) Appl. No.: 16/688,098

(22) Filed: Nov. 19, 2019

(65) Prior Publication Data

US 2020/0079469 A1    Mar. 12, 2020

Related U.S. Application Data

(63) Continuation of application No. 15/575,285, filed as application No. PCT/GB2016/052355 on Jul. 29, 2016, now Pat. No. 10,513,309.

(30) Foreign Application Priority Data

Jul. 31, 2015  (GB) ...................................... 1513575
Apr. 27, 2016  (GB) ...................................... 1607341

(51) Int. Cl.
  *B62M 6/50*       (2010.01)
  *B62M 6/45*       (2010.01)
  (Continued)

(52) U.S. Cl.
  CPC ................ *B62M 6/50* (2013.01); *B62M 6/25* (2013.01); *B62M 6/45* (2013.01); *B62M 6/60* (2013.01);
  (Continued)

(58) Field of Classification Search
  CPC . B62M 6/25; B62M 6/45; B62M 6/50; B62M 6/60; B62M 9/06; B62M 11/14; H02K 7/16; H02P 5/00
  See application file for complete search history.

(56) References Cited

U.S. PATENT DOCUMENTS 6,296,072 B1 * 10/2001 Turner .................... B62K 19/48
                                                    180/65.6
9,758,213 B2 *  9/2017 Kawakami ............... B62M 9/12
                    (Continued)

FOREIGN PATENT DOCUMENTS

EP        0697331 B1    11/1997
EP        1642820        4/2006
                    (Continued)

OTHER PUBLICATIONS

Written Opinion of the International Preliminary Examining Authority; dated Jul. 13, 2017; 5 pages.
(Continued)

*Primary Examiner* — Tony H Winner
(74) *Attorney, Agent, or Firm* — Olson & Cepuritis, Ltd.

(57) ABSTRACT

There is provided a method of controlling a pedal cycle and a pedal cycle incorporating the same. The pedal cycle has an electro-mechanical drive arrangement including a continuously variable ratio transmission system having an input which is mounted to rotate about the axis and an output connected to rotate with a hub member, the transmission system comprising an epicyclic gear set including a sun gear in mesh with a plurality of planet gears mounted to rotate about respective planet shafts carried by a common carrier, which is mounted to rotate with the input about the axis, the planet gears being in mesh with an annulus gear, which is connected to rotate with the hub member. Only the sun gear may be connected to rotate a rotor of an electrical machine or an additional machine may be provided. The electrical connections of the stator of the electrical machine are connected to a controller; the method may include the step of applying a time division multiplexed control algorithm to the electrical machine, wherein the time division multiplexed control algorithm alternates between a first control mode in which current generated by the electrical machine
(Continued)

is monitored to infer torque applied to the crank arms of the cycle and a second control mode in which the current in the input electrical machine is controlled using the inferred torque.

24 Claims, 9 Drawing Sheets

(51) Int. Cl.
    *B62M 6/25*     (2010.01)
    *B62M 6/60*     (2010.01)
    *B62M 11/14*     (2006.01)
    *H02K 7/116*     (2006.01)
    *H02P 5/00*     (2016.01)
    *B62M 9/06*     (2006.01)

(52) U.S. Cl.
    CPC .............. *B62M 9/06* (2013.01); *B62M 11/14* (2013.01); *H02K 7/116* (2013.01); *H02P 5/00* (2013.01)

(56) References Cited

U.S. PATENT DOCUMENTS

| | | | |
|---|---|---|---|
| 10,392,076 B2 * | 8/2019 | Capozzella | B60L 50/53 |
| 11,014,627 B2 * | 5/2021 | Hawkins | B62M 6/90 |
| 2012/0010036 A1 * | 1/2012 | Moeller | B62M 6/65 |
| | | | 475/149 |
| 2015/0120119 A1 * | 4/2015 | Tauchi | B62M 15/00 |
| | | | 701/22 |
| 2015/0122565 A1 | 5/2015 | Deleval | |

FOREIGN PATENT DOCUMENTS

| | | |
|---|---|---|
| JP | 2008-285069 | 11/2008 |
| WO | 2010092345 | 8/2010 |
| WO | WO2013/160477 A1 | 10/2013 |
| WO | 2016098842 | 6/2016 |

OTHER PUBLICATIONS

Response to Written Opinion; dated May 31, 2017; 5 pages.
UKIPO Communication; dated Jan. 20, 2016; 5 pages.
UKIPO Exam; dated Oct. 25, 2016; 5 pages.
International Search Report and the Written Opinion of the International Searching Authority; dated Nov. 3, 2016; 11 pages.

* cited by examiner

METHOD OF CONTROLLING AN ELECTROMECHANICAL DRIVE MECHANISM

CROSS-REFERENCE TO RELATED APPLICATIONS

This patent application is a continuation of U.S. patent application Ser. No. 15/575,285 entitled "A Method of Operating a Pedal Cycle Having an Electro-Mechanical Drive Arrangement" which was filed on Nov. 17, 2017, which is a 371 of PCT/GB2016/052355, filed Jul. 29, 2016, which claims the benefit of GB 1607341.3, filed Apr. 27, 2016, and GB 1513575.9, filed Jul. 31, 2015. The disclosures of those applications are incorporated into this application by reference.

FIELD

This disclosure relates to a method of operating a pedal cycle having an electro-mechanical drive arrangement.

BACKGROUND

There are various forms of pedal cycle. One, conventional, form of pedal cycle is that which is only ever driven by a cyclist applying force to the pedals thereof, such cycles sometimes being referred to as "push bikes". Another, more recent, form of pedal cycle is the electrically-assisted pedal cycle (EAPC) in which electrical power is used to assist or replace the efforts of the rider. Both conventional pedal cycles and EAPCs may have two, three or four wheels, and, in some, cases even more. In the present document, the term "pedal cycle" is used to include both conventional pedal cycles and EAPCs.

As mentioned, in an EAPC, electrical power is used to assist, or in some cases replace, the efforts of the rider. Accordingly, EAPCs include means for storing electrical energy, such as batteries, and an electric motor arranged to propel, either in combination with pedal input, or to replace pedal input. The batteries can usually be recharged by plugging them into a supply of electrical energy, such as an outlet from a mains supply; in some cases, also by recovering energy from motion of the cycle by way of regenerative braking, and in others by generation of electricity in a series hybrid configuration. The principle of regenerative braking will be familiar to those skilled in this field of technology.

As a result, the overall effort usually required by a cyclist to pedal an EAPC is lower than for a conventional cycle.

EAPCs can usually be placed into one of two groups. The first group is that in which the cycle can provide electrical assistance on demand, at any time, regardless of whether or not the cyclist is pedaling. Cycles in this group are sometimes referred to as "e-bikes", and can be thought of as being generally equivalent to electric mopeds, although one that is generally easier to pedal. Cycles in the second group only provide electrical assistance when the cyclist is pedaling. These are sometimes referred to as "pedelecs".

Currently, in most European countries, including the UK, pedelecs at least are effectively legally classified as conventional bicycles and so may be ridden without a driving licence or insurance, providing electric assistance ceases at a speed of 25 kph. There are therefore few barriers to owning and operating an EAPC.

In recent years, technical advances have been made to the electro-mechanical drive arrangements and to the associated energy storage and recovery devices used in EAPCs. These advances have resulted in EAPCs that can be operated with greater efficiency, and hence greater ease, by the cyclist.

For all the reasons given above EAPCs are becoming increasing popular, particularly in some European countries.

Since pedelecs only provide assistance when the rider is pedaling, there is a requirement to make an assessment of whether this is the case. Many pedelecs achieve this through either a torque sensor, or a movement sensor, such as a cadence sensor. A movement sensor recognises when the pedals of the pedelec are rotated and switches the motor on in response. By incorporating a minimum force level, a torque sensor installation can avoid accidental initiation of the motor due to unintended slight movement of the pedals when the bike is stationary. In those installations with only a basic movement sensor there has to be a delay between the rotation of the pedals starting and the motor being initiated. That is to say, the motor is only initiated once movement has been taking place for a predetermined period of time. As a result, there is delay before the rider is provided with any assistance when moving off. Not only does this fail to assist the rider at this time, but may also provide an uncomfortable or counter-intuitive rider experience when the motor eventually starts.

In some pedelecs the motor is either off or fully switched on (or perhaps subject to manual user control to define the level of assistance desired). That is to say, there is no relationship between the rider's pedaling and the level of assistance provided once the motor has started. However, in other examples an attempt is made to introduce such a link. For example, control may be provided to cause the motor to provide greater assistance when the rider is pedaling at greater speed. However, this link can itself be counter-intuitive since the speed or cadence of the rider's turning the pedals is not directly linked to the power output in geared bicycles. In a lower gear, a given cadence represents a lower power output than it would in a higher gear. Thus, control of the power output of the motor based on the cadence of the pedals does not provide an intuitive link between the effort exerted by the rider and the assistance provided by the motor. For example, greater assistance can be achieved by a rider by switching to a lower gear in order to increase cadence without exerting any greater effort.

Torque sensors can improve the link between rider actions and the support provided by the motor. Such sensors assess not the cadence of the pedals but the torque applied, and thus more clearly reflect the intentions and activities of the rider. This may be of benefit both at the launch procedure, where accidental initiation can be avoided by requiring a threshold torque to be applied and during general riding where the feedback between the effort exerted by the rider and the input of the motor may be improved. However, torque sensors can be difficult to implement and are significantly expensive. In addition torque sensors often limit the flexibility in terms of frame type available for the bicycle, often do not provide continuous assessment of torque levels and can add to the weight of the bicycle.

In another approach, described in international patent application WO2010/092345 there is provided a system with an input electrical machine and an output electrical machine, the input electrical machine being coupled to the pedal input and the driven cycle wheel via an epicyclic gear set and the output electrical machine being used to assist in drive of the cycle. The input electrical machine is operated as a generator to at least partly power the output electrical machine as a motor. The current in the input electrical machine is controlled to ensure the torque applied by the pedals is appropriate for a desired input power set by the user, taking account of measurements of the angle of the pedal crank arms and a detected cadence. In this way, the feedback provided by the pedals is intended to offer a consistent experience. In particular, the control of the current in the input electrical machine results in an effective variation of the transmission ratio between the pedals and the electrical machine should the cyclist exceed or undershoot the desired torque levels. As such, there is an effective automatic gear change to allow the cyclist to cope with changes in conditions.

While this approach provides some benefits in user experience, during the launch process (i.e. when the bicycle is started from stationary) there is no initial feedback from either electrical machine as no current passes when stationary. Thus, the difficulties with providing an effective launch process are shared with pedelecs adopting movement or cadence sensors explained above. While a torque sensor may assist with this, such sensors suffer from the drawbacks outlined above. Moreover, implementations of the system described in WO2010/092345 have suffered from difficulties in the pedal feedback; in particular, variations in the feedback provided during the pedal cycle can feel peculiar to riders unused to such a system.

There remains, therefore, a desire to provide an improved system and method for control of pedelec motors, particularly with reference to the pedal feedback and the launch procedure of such devices.

SUMMARY

According to a first aspect of the disclosure, there is provided a method of operating a pedal cycle, the pedal cycle having an electro-mechanical drive arrangement including a continuously variable ratio transmission system having an input which is mounted to rotate about the axis and an output connected to rotate with a hub member, the transmission system comprising an epicyclic gear set including a sun gear in mesh with a plurality of planet gears mounted to rotate about respective planet shafts carried by a common carrier, which is mounted to rotate with the input about the axis, the planet gears being in mesh with an annulus gear, which is connected to rotate with the hub member, the annulus gear being connected to rotate with a rotor of an output electrical machine and the sun gear being connected to rotate a rotor of an input electrical machine, the electrical connections of the stators of the two electrical machines being connected by a controller arranged to control the transmission of power from one electrical machine to the other; the method including the steps of:
a) operating the input electrical machine as a generator to at least partly power the output electrical machine as a motor;
b) applying a time division multiplexed control algorithm to the input electrical machine, wherein the time division multiplexed control algorithm alternates between a first control mode in which current generated by the electrical input machine is monitored to infer torque applied to the crank arms of the cycle and a second control mode in which the current in the input electrical machine is controlled using the inferred torque.

In a second aspect, there is provided a method of operating a pedal cycle, the pedal cycle having an electro-mechanical drive arrangement including a continuously variable ratio transmission system having an input which is mounted to rotate about the axis and an output connected to rotate with a hub member, the transmission system comprising an epicyclic gear set including a sun gear in mesh with a plurality of planet gears mounted to rotate about respective planet shafts carried by a common carrier, which is mounted to rotate with the input about the axis, the planet gears being in mesh with an annulus gear, which is connected to rotate with the hub member, only the sun gear being connected to rotate a rotor of an electrical machine, the electrical connections of the stator of the electrical machine being connected to a controller; the method including the step of:
applying a time division multiplexed control algorithm to the electrical machine, wherein the time division multiplexed control algorithm alternates between a first control mode in which current generated by the electrical machine is monitored to infer torque applied to the crank arms of the cycle and a second control mode in which the current in the input electrical machine is controlled using the inferred torque.

According to these aspects, the torque applied to the crank arms by a rider of the pedal cycle can be inferred from the current generated by the electrical machine during riding. Accordingly, there is no requirement for an independent torque sensor to be provided. Moreover, during the second control mode the current in the input electrical machine is controlled. This effectively controls the torque on the input electrical machine during the second control mode (since this is proportional to current). As the input electrical machine is coupled to the crank arms by the second epicyclic gear set, controlling the torque in the input electrical machine also controls the torque in the crank arms (the two are proportional), which is the torque that the cyclist applies. Thus, controlling the current in the input electrical machine determines the torque which the cyclist has to apply to maintain constant rotation during the second control mode.

Controlling the current in this way can enable the arrangement to automatically "change gear" during general operation. For example, should the cyclist press on the pedals with more force such that he or she applies torque that results in a current in the input electrical machine that exceeds that applied during the second control mode, the electrical machine "gives way" and so accelerates. This changes the transmission ratio of the input epicyclic gear set to, in effect, change into a lower gear. Thus, when the torque that the cyclist applies increases, the arrangement automatically changes down into a lower gear. Thus, the arrangement automatically changes down in conditions when this is needed, such as when climbing a hill or accelerating rapidly.

Similarly, should the cyclist press the pedals with less force and hence apply less torque than the torque that corresponds to the current of the input electrical machine during the second control mode, the electrical machine decelerates and resists motion of the crank arms by the cyclist. This deceleration of the input electrical machine again changes the transmission ratio of the second epicyclic gear set to, in effect, change into a higher gear. Thus, when the torque that the cyclist applies falls, the arrangement automatically changes up into a higher gear. Thus, the arrangement automatically changes up in conditions when this is needed, such as when going downhill or when easing off and approaching a steady speed from a period of acceleration.

In this way, the torque sensing capabilities of the second electrical machine may be used in conventional pedal cycles and in EAPCs to provide an arrangement for automatically changing gear while the rider is cycling the pedal cycle.

In the second aspect, no output electrical machine is provided. That is to say, there is no electrical machine coupled to the annulus in this aspect. As such, the relative cost and weight of the cycle may be reduced in comparison. The control method of the second aspect ensures that although the annulus is unconstrained by a second motor, the sun gear and planetary gears remain balanced.

Furthermore, for both aspects, the ability to sense the torque through the input electrical machine can assist in controlling a launch process. That is to say, by sensing the torque the arrangement can sense when the rider intends to move off from a stationary position. In preferred embodiments of the first aspect, the method further comprises initiating operation of the output electrical machine as a motor when the inferred torque exceeds a threshold value. In this way, the output electrical machine may be initiated only when a meaningful torque is applied to the pedals by the rider, rather than responding to minor adjustments in pedal position. For example, while stationary, riders often adjust the position of the pedals to an optimum arrangement for beginning the pedaling process (typically with one pedal higher than the other). By adopting the preferred approach, one can avoid initiating the output electrical motor in response to such adjustments.

In preferred embodiments, the control of the current applied to the input electrical machine in response to the inferred torque during the second control mode is dependent upon whether the pedal cycle is in a launch routine or an in-motion routine. Both the input electrical machine and the output electrical machine may be coupled to a single electrical power source (such as a battery).

During the launch routine, the output electrical machine may take priority over the input electrical machine for receiving current from the electrical power source. As such, the output electrical machine may be used to assist the rider in bringing the pedal cycle up to the desired speed without sacrificing electrical power to control of the input electrical machine. This will also have the effect of shifting the pedals to a relatively low gear as the torque provided by the rider exceeds that generated by input electrical machine during the second control mode. The rider is therefore able to start the pedals moving at a preferred cadence without having to work against the input electrical machine.

In some embodiments, the method may further comprise the step of determining that the bicycle and/or the crank arms are substantially stationary and, in response thereto, substantially short-circuiting the input electrical machine. This can include short circuiting two or all three phases of the input electrical machine. Furthermore, in some embodiments, the method includes the step of maintaining the substantial short-circuiting of the input electrical machine until the actual current in the input electrical machine reaches a predetermined threshold current. This threshold may be set in software.

During an in-motion routine, the input electrical machine may take priority over the output electrical machine for receiving current from the electrical power source. In this manner, a current may be applied to the input electrical machine during the second control mode which is calculated to match the inferred torque identified during the first control mode. Accordingly, the rider is provided with consistent feedback from the pedals during the in-motion routine. This is found to offer a satisfying and intuitive riding experience.

It will be appreciated by the skilled person that current control of an electrical machine may be readily accomplished with existing electrical components. Thus, embodiments of the method can be used to provide automatic transmission-ratio control in a conventional manual-only pedal cycle and/or in an EAPC in a straightforward and inexpensive manner. It should also be noted that the use of an epicyclic gear set in this way provides continuously-variable transmission, rather than the stepped gearing usual with cycles that often changes gear unsatisfactorily under heavy loads.

The method may include operating control means to operate the input electrical machine as a generator and/or to operate the output electrical machine as a motor and/or to control the current in the input electrical machine. The control means may include one or more motor controllers and/or one or more generator controllers.

During the second control mode, and particularly during the in-motion routine, the current in the input electrical machine may be controlled to lie in a range between a maximum current and a minimum current, the maximum and minimum currents being calculated using the inferred torque. The maximum current and the minimum current may be different values; they may be the same value. Where they are different values, this creates a band within which the torque applied by the cyclist may vary without the arrangement "changing gear", i.e. varying the transmission ratio. In this way, the arrangement mimics, at least to some degree, the behaviour of a conventional geared cycle and so may find favour with some cyclists more used to such conventional cycles. Where the maximum current and minimum current are the same, this results in the arrangement varying the transmission ratio whenever the torque applied by the cyclist differs from that corresponding to the current drawn from the input electrical machine during the second control mode. This arrangement can be used to cause the cyclist to cycle with a torque that is close to, or coincides with, optimum cycling efficiency.

The method may include supplying all electrical energy generated by the input electrical machine to the output electrical machine for operating the output electrical machine as a motor.

In this way, a conventional pedal cycle fitted with the electro-mechanical arrangement may be provided with an arrangement for automatically changing gear.

The method may include supplying stored electrical energy to the output electrical machine from a store of electrical energy for operating the output electrical machine as a motor. The method may include supplying stored electrical energy in this way to supplement electrical energy generated from the input electrical machine and supplied to the output electrical machine. The method may include receiving an assist input indicating that stored electrical energy should be supplied to the output electrical machine to supplement electrical energy supplied thereto and generated by the input electrical machine; and may include supplying stored electrical energy accordingly in response to receipt of the assist input. The method may include operating the control means to supply stored electrical energy in this way. In this way, stored electrical energy can be used to assist the cyclist in propelling the cycle.

The assist input may be received from assist input means operable by the cyclist.

The assist input may be indicative of one of a plurality of selectable levels of assistance that is to be provided to the cyclist. The assist input may be indicative of a factor by which the power input by the cyclist should be augmented by power supplied to the output electrical machine by discharging the store of electrical energy. The method may include discharging the store of electrical energy and operating the output electrical machine at least partly thereby, in response to receipt of the assist input.

The method may include operating the input electrical machine and/or the output electrical machine as a generator to retard the pedal cycle. Electrical power generated in this way may be used to recharge the store of electrical energy. The method may include operating one or both of the electrical machines inefficiently, for example, by shifting the phase of the current and/or voltage thereof to dissipate generated electrical energy as heat and thereby retard the pedal cycle. The method may include operating the input electrical machine and/or the output electrical machine as a generator in this way in response to a signal from a brake input device operable by the cyclist. The brake input device may be a brake lever. The method may include operating the input and/or output electrical machine in this way in response to sensing backwards movement of the crank arms; and optionally, backwards movement of the crank arms when the crank arms are between 60 degrees and 120 degrees to the vertical when the pedal cycle is on level ground.

The pedal cycle may be, for example, a conventional pedal cycle in which drive is only ever provided by a cyclist applying force to the pedals thereof, such cycles sometimes being referred to as "push bikes". The pedal cycle may be, for example, an EAPC, such as, for example, a pedelec or an e-bike. The pedal cycle may have one, two, three, four or more wheels. The pedal cycle may be a bicycle (including solo and tandem bicycles), a tricycle, or conceivably any form of cycle which can be at least partly propelled by a cyclist pedaling.

In some preferred embodiments, the electrical drive arrangement further includes a one-way clutch, which includes a drive member, which is constituted by the common carrier, and a driven member, which is connected to rotate with the hub members, the one-way clutch being arranged to connect the hub member to rotate with the carrier as soon as the carrier rotates faster than the hub member. Accordingly, the hub may include a one-way clutch which is arranged to connect the hub member to rotate with the carrier if the carrier attempts to rotate faster than the hub member which in practice occurs as soon as any substantial torque is applied to the input. This means that if the hub is fitted to a bicycle, as soon as the rider applies any significant pressure to the pedals, thereby applying a torque to the input of the transmission system, the one-way clutch engages and thus connects the carrier to the hub member. This results in the input immediately being connected to rotate with the hub member and thus in the propulsive force exerted by the cyclist immediately being transmitted to the hub member and thus to the bicycle wheel. This reduces the possibility of the pedal crank initially rotating with much reduced resistance before engaging fully, which phenomenon is inconvenient and disconcerting for the rider, particularly at launch.

In preferred embodiments, the electrical drive arrangement further includes an active clutch, the method further comprising controlling the active clutch to selectively operate the electrical machine as a generator. In this manner, even when the output electrical machine is not present, regenerative braking can be applied to recharge the battery.

According to a further aspect of the disclosure, there is provided a pedal cycle arranged to carry out a method as defined hereinabove.

It can also be appreciated that aspects of the disclosure can be implemented using computer program code. Indeed, according to a further aspect of the present disclosure, there is therefore provided a computer program product comprising computer executable instructions for carrying out the method of the first aspect. The computer program product may be a physical/tangible storage medium. For example, the storage medium may be a Read Only Memory (ROM) or other memory chip. Alternatively, it may be a disk such as a Digital Versatile Disk (DVD-ROM) or Compact Disk (CD-ROM) or other data carrier. It could also be a signal such as an electronic signal over wires, an optical signal or a radio signal such as to a satellite or the like. The disclosure also extends to a processor running the software or code, e.g. a computer configured to carry out the method described above.

BRIEF DESCRIPTION OF THE DRAWINGS

Specific embodiments will now be described by way of example only and with reference to the accompanying drawings, in which.

DETAILED DESCRIPTION

[Structural Arrangement]

Figure 1:
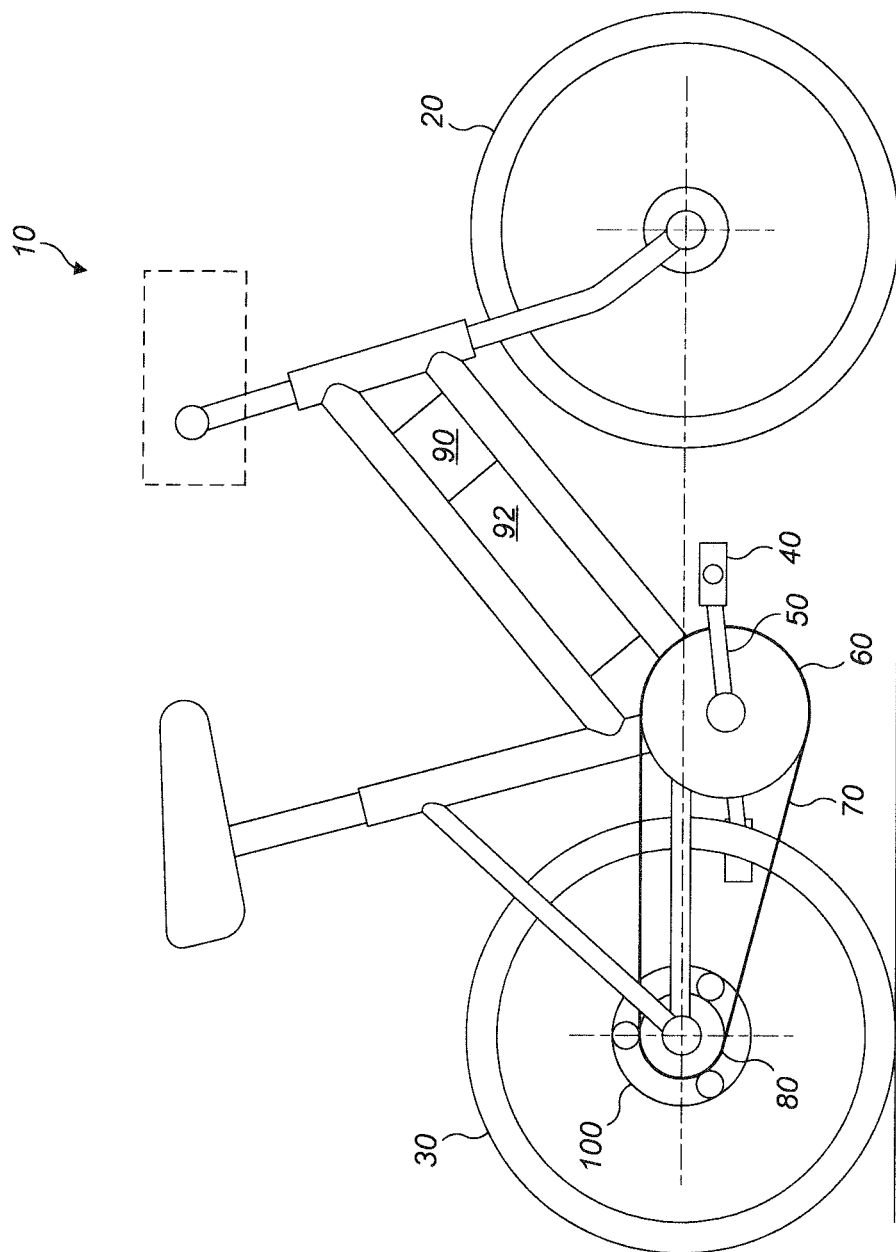
FIG. 1 shows a pedal cycle.

FIG. 1 shows an electrically-assisted pedal cycle in the form of a bicycle 10. The bicycle 10 is similar to a conventional bicycle in having a steerable wheel 20 at the front and a driveable wheel 30 at the back. The bicycle 10 also has the conventional arrangement of pedals 40 on crank arms 50 that drive a front toothed cog 60 connected by a chain 70 to a rear sprocket 80, the rear sprocket being mounted co-axially with the rear wheel 30. However, the bicycle 10 differs from a conventional bicycle in that the rear sprocket 80 is not fixedly mounted to the hub 100 of the rear wheel 30 to drive that wheel directly. Instead, the rear sprocket 80 drives certain components of an electro-mechanical drive arrangement that are housed within the hub 100.

Figure 2A:
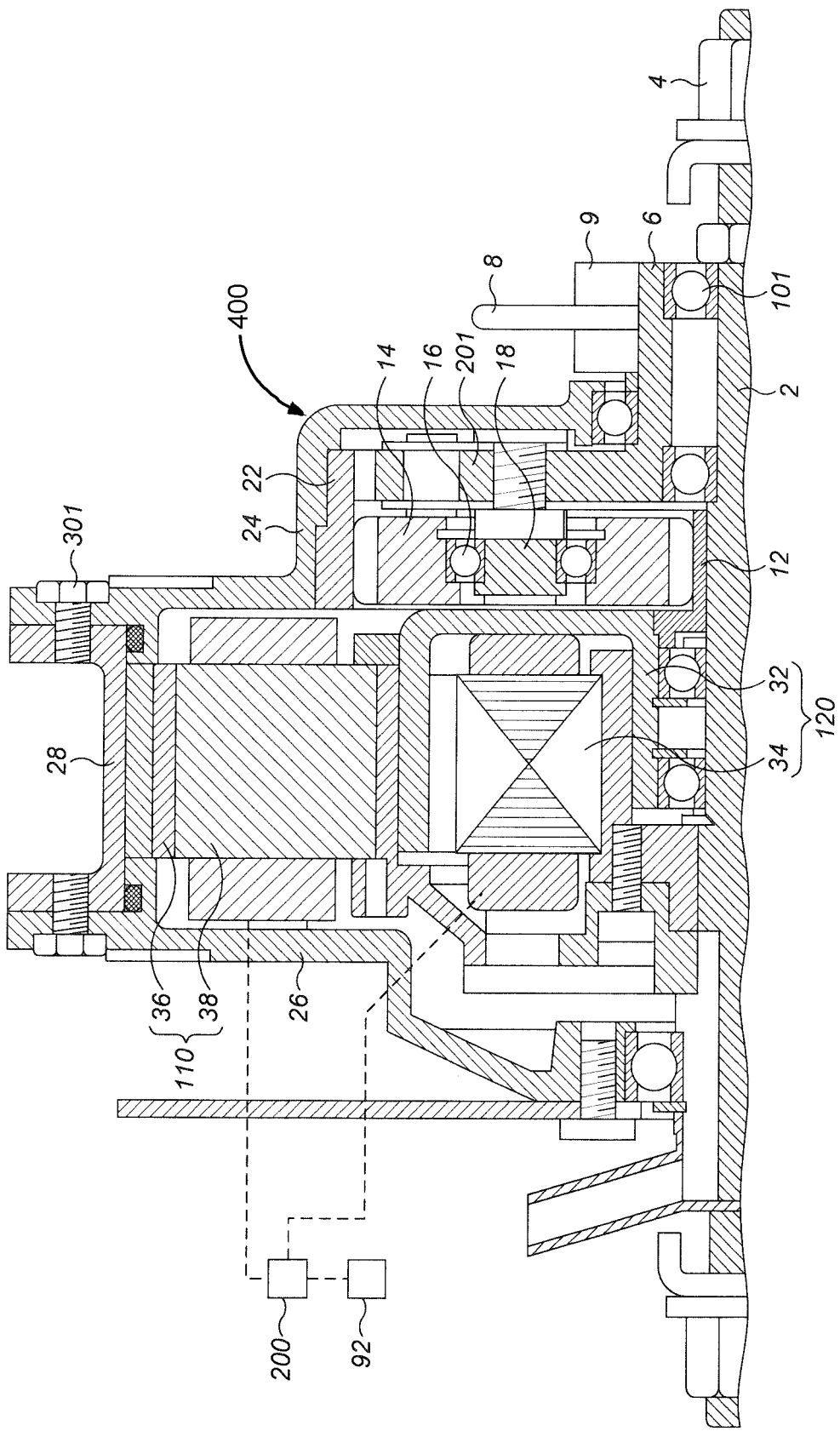
FIG. 2A shows an axial sectional view of the upper half of a bicycle hub according to a first embodiment.

FIG. 2a shows the hub 100 of a first embodiment and its contents in detail. The hub is mounted on a central shaft 2 which, in use, is fixedly secured to a bicycle frame by means of two nuts 4. The hub includes an annular input member 6, which is connected to a conventional bicycle sprocket wheel 80 via a conventional freewheel mechanism 9, which is not shown in detail. The input member 6 is mounted on a number of bearings 101 to rotate about the shaft 2. The input member 6 is also connected to a single three-branch epicyclic gear set, all three branches or shafts of which rotate. The transmission system includes a sun gear 12, which is mounted to rotate about the shaft 2 and carries teeth in mesh with teeth carried by a number, typically 3, of planet gears 14. The planet gears 14 are rotatably carried by way of bearings 16 by respective planet shafts 18, which are connected to a common carrier 201. The teeth on the planet gears 14 are also in mesh with the teeth on an annulus gear 22, which is fixedly connected to the right-hand portion 24 of a hub housing. The right-hand portion 24 of the hub housing is connected to a left-hand portion 26 by means of a central portion 28, which is connected to the right- and left-hand portions 24, 26 by means of bolts 301.

Accommodated within the hub housing are two electric motor/generators (electrical machines), which are arranged coaxially, with one motor/generator situated within the other. The inner motor/generator, or input electrical machine 120, includes a rotor 32, which is connected to rotate with the sun gear 12, and a stator 34. The outer motor/generator, or output electrical machine 110, includes a rotor 36, which is fixedly connected to the central portion 28 of the hub housing, and a stator 38. The electrical connections of the two stators are connected to a controller 200, which is shown only schematically and is also connected to a rechargeable electric battery 208. The controller 200 is programmed to control the flow of electrical power between the two motor/generators and between the electric battery 208 and each of the two motor/generators in accordance with requirements.

Figure 2B:
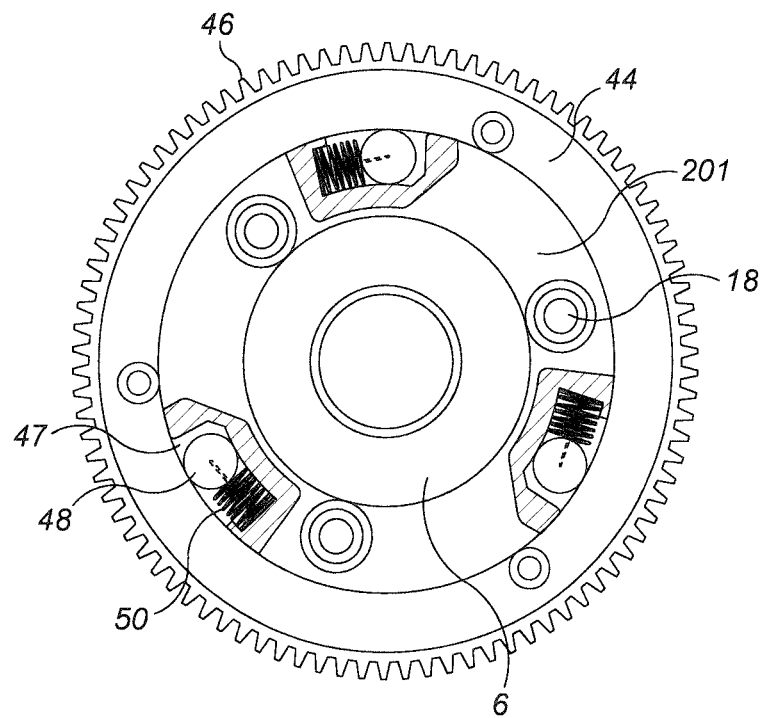
FIG. 2B shows a view of a one-way clutch, seen from the right in FIG. 2A, above an axial sectional view of the one-way clutch.
Figure 2B:
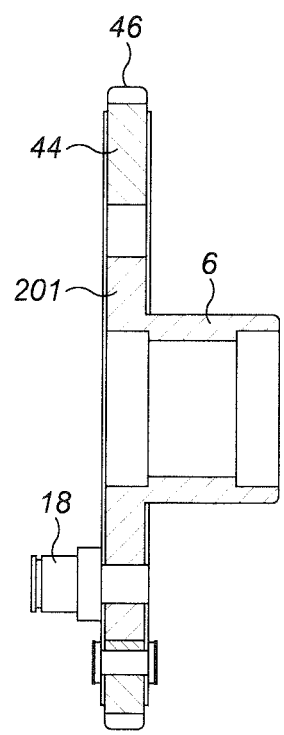

The common carrier 201 is integral with the input member 6, and constitutes the input member or drive member of a one-way clutch. It has a circular outer periphery, which is closely surrounded by the circular inner periphery of an annular driven member 44 of the one-way clutch, the outer periphery of which bears teeth 46, which are also in mesh with the internal teeth on the annulus gear 22, which is fixedly connected to the hub housing portion 24. Formed in the outer periphery of the inner or drive member 20 of the one-way clutch is a plurality, in this case three, of recesses 47 extending in the peripheral direction. Accommodated in each of these recesses is a jamming ball 48 and a biasing spring 50. The dimension or width of each recess 47 in the radial direction is greatest at the end remote from the spring 50 and at this end it has a value greater than the diameter of the associated jamming ball 48. However, its width decreases in the direction towards the biasing spring 50 to a value less than the diameter of the jamming ball 48. The biasing springs urge the balls 48 to the ends of the recesses 47 remote from the springs 50 at which the width of the recess is greater than the diameter of the balls and when the balls are in this position the drive and driven members 20 and 44 of the one-way clutch are freely rotatable with respect to one another and the clutch is thus disengaged. However, if the inner or drive member of the clutch should move in the clockwise direction as seen in FIG. 2b, that is to say if the user of the bicycle should exert a force on the pedals, which is transmitted by the bicycle chain to the sprocket 8 and then to the drive member 201 in the form of a torque tending to rotate the drive member 201, the balls 48 are caused to move in the anticlockwise direction, seen in FIG. 2b, and thus towards the region in which the width of the recesses is less than the diameter of the balls. As the balls approach this region, they become jammed between the bases of the recesses 47 and the inner periphery of the outer or driven clutch member 44 and thus act to rotationally connect the two clutch members 20 and 44. Continued rotation of the input member 6 and thus of the clutch member 20 is therefore transmitted directly to the driven clutch member 44 and thus also to the annulus gear 22 and to the hub housing 24, 26, 28, thereby resulting in rotation of the bicycle wheel. If the user should subsequently cease to exert a pressure on the pedals, the force exerted by the biasing springs 50 will be able to return the balls 48 into the regions of the recesses 47 where their width is greater than the diameter of the balls and the rotary connection of the two clutch members is therefore released.

In use, one of the motor/generators generally acts as a generator and transmits electrical power to the other motor/generator, which acts as a motor. The amount of electrical power so transmitted may be selectively varied by means of the controller 40, thereby altering the transmission ratio of the transmission system. Power is transmitted through the transmission system both mechanically and electrically in proportions which vary with the varying transmission ratio. The output speed of the transmission system and thus the speed of the hub member may thus be varied independently of the input speed, which means that the speed of the wheel connected to the hub member in accordance with the invention may be varied independently of the speed at which the pedals are rotated and/or the speed of that one of the motor/generators which is operating as a motor and is providing a motive torque to propel the bicycle or to assist the user in propelling the bicycle. This means that the transmission may be operated precisely at the speed which is the most appropriate for the driving conditions and matches the wishes of the user, as indicated by one or more user-operable controls.

The electric motor/generators are thus not only the means by which the transmission ratio of the transmission system may be continuously varied but also the means by which electrical power from the battery may be converted into mechanical power and transmitted to the bicycle wheel. The motor/generators preferably also serve a dual function in that if the bicycle is travelling at a speed in excess of that desired by the user, for instance because the bicycle is freewheeling downhill, as indicated e.g. by the user applying the brakes, the controller can be programmed to cause one or both motor/generators to operate as a generator and to direct the electrical power produced to the electric battery so as to recharge it.

Whilst one or both of the electric motor/generators may be used in motor mode to drive the bicycle for a major proportion of the time, it is envisaged that the hub in accordance with the invention will be used primarily on a motor-assisted bicycle rather than a motorcycle and thus that the user will contribute to the motive power needed to propel the bicycle for a major proportion of the operating time. As explained above, when the user applies a driving force to the pedals, the one-way clutch will immediately engage and the force applied by the user will then be directed immediately to the driven bicycle wheel with no pedal precession.

Figure 3:
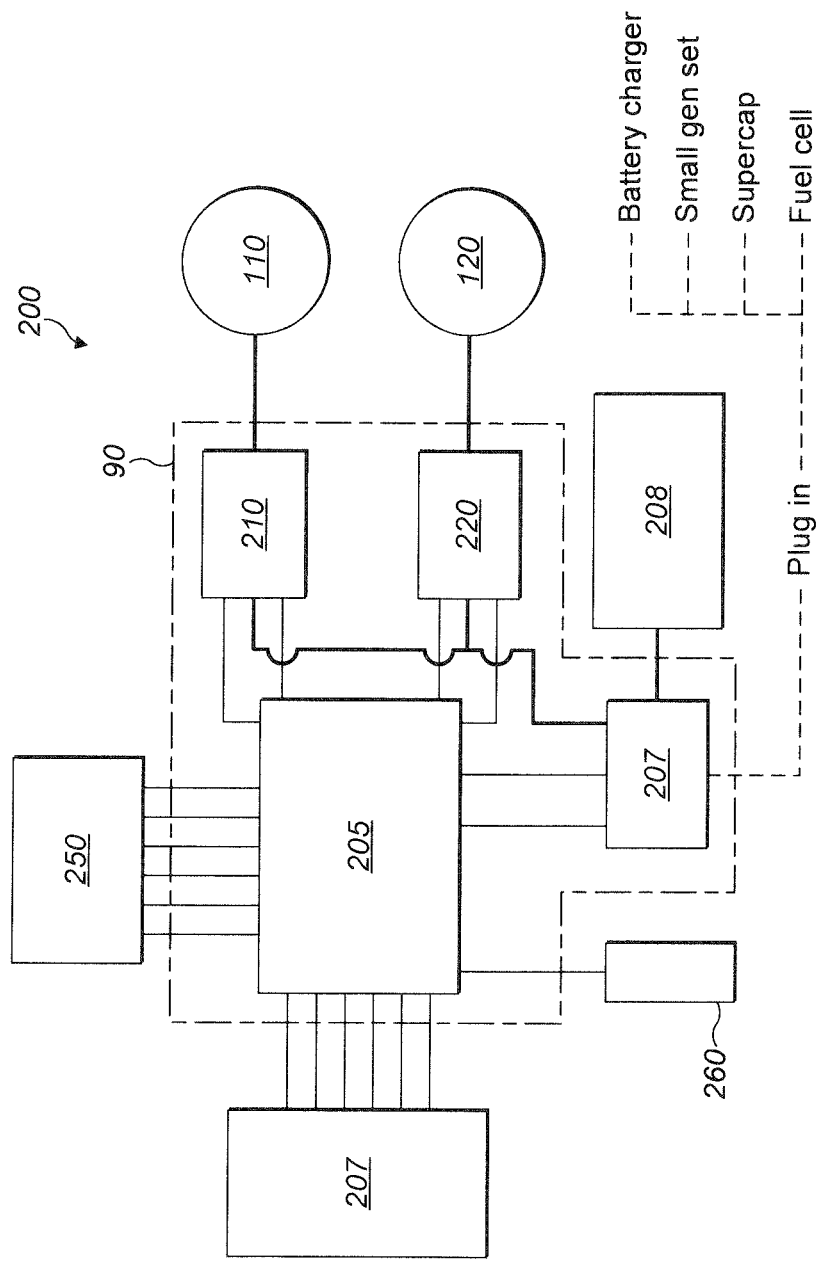
FIG. 3 is schematic representation of control means for controlling operation of the drive arrangement.

Further details of controller 200 can be understood with reference to FIG. 3. In particular, the control means is connected and arranged to control the input and output motor-generators 110, 120 in response to inputs received from input means. The controller 200 is in the form of an electronic control unit (ECU) 205, a battery management unit 207 and two motor-generator controllers: one of which will be termed the "input controller" 210 and is for controlling the input motor-generator 120, and the other one of which will be termed the "output controller" 220 and is for controlling the output motor-generator 110. The ECU 205 includes a microprocessor that is programmable and operable to carry out the steps of a method that embodies this invention. That method will be described herein below with reference to FIG. 3 and FIG. 5. The ECU 205 is connected to the input controller 210, the output controller 220 and the battery management unit 207 for controlling operation of those three units.

The input means that provide inputs to the controller 40 includes user input means 250 and a crank speed and position sensor 260, which may be a hall sensor. The user input means 250 includes, in this embodiment, a user-operable power input device and a user-operable brake input device (none of which is shown). The power input device is arranged to be operated by a user to indicate generally the power that is the rate of working, with which he or she wishes to pedal. The brake input device is arranged to be operated by the user to indicate a rate at which the bicycle 10 should be slowed.

In this embodiment, it is envisaged that the power input device is a user-operable selector that indexes between each of a plurality of different positions. Examples of such selector switches are twistable grip-shifts and thumb shifters commonly used in gear-change mechanisms of conventional bicycles. It is envisaged that the brake input device may be similar to a conventional brake lever. However, in the present embodiment, it is envisaged that electrical versions of such selector switches and of the brake lever be used such that each is able to produce an electrical signal indicative of its user-selected position. The crank speed and position sensor 260 is a conventional device that is arranged to sense the speed and angular position of the crank arms 50 and to output an electrical signal indicative of this. Each of the input means is connected and arranged to provide its respective electrical signal to the ECU 205.

A further output from the control means 200 is connected to an instrument panel 270.

The battery management unit 207 is connected to electrical energy storage means in the form of a rechargeable battery 208.

With reference again to FIG. 1, the ECU 205, the input controller 210, the output controller 220 and the battery management unit are housed within a control housing 90 fitted to the frame of the bicycle 10. The battery 208 is housed within a battery housing 92 that is also fitted to the frame.

[Operation]

Operation of the bicycle 10 will now be described. This description will take the form of a description of the steps of a method carried out by the ECU 205 in executing instructions contained in a computer program with which it is programmed.

Figure 4:
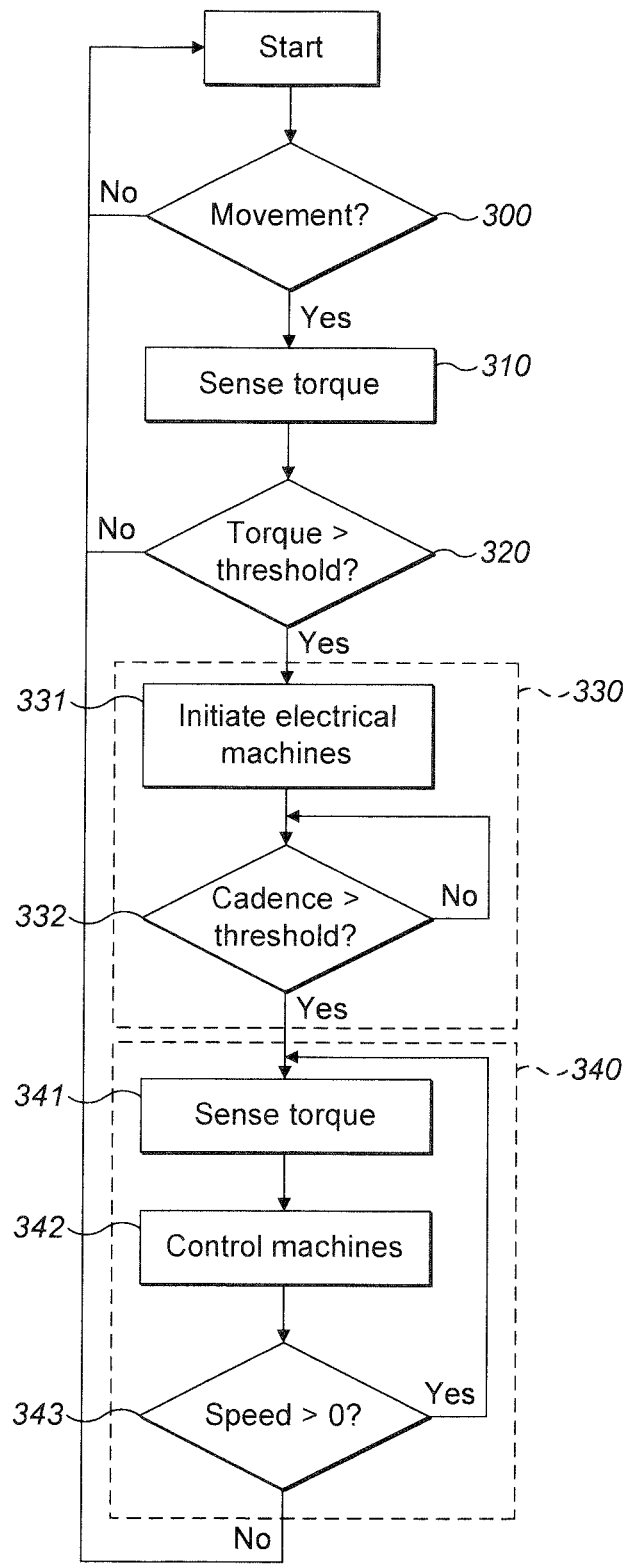
FIG. 4 is a flow diagram of steps of one embodiment of a method of operating the pedal cycle, the steps including steps of a "launch" routine and an "in-motion" routine.

With reference to FIG. 4, the method begins from a stationary start at step 300 in which the crank speed and position sensor 260 is used to sense movement of the pedals 40. If no movement of the pedals is identified then the method continues to monitor for further events.

If movement of the pedals is identified, the method moves to step 310, wherein the torque applied to pedals 40 is sensed using the input electrical machine 120. The input electrical machine is operated throughout the method according to a time division multiplexed control algorithm to the input electrical machine. The time division multiplexed control algorithm alternates between a first control mode in which current generated by the input electrical machine 120 is monitored to infer torque applied to the crank arms of the cycle and a second control mode in which the current in the input electrical machine 120 is controlled in dependence on the inferred torque. At step 310, the torque is sensed during the first control mode.

At step 320, the controller 200 determines if the torque sensed at step 310 exceeds an initiation threshold. If the torque sensed at step 310 exceeds the initiation threshold, a launch routine 330 is initiated.

During launch routine 330, electrical power is provided to output electrical machine in order to assist in bringing the bicycle up to speed at step 331. The input electrical machine 340 is also initiated at step 331 in response to the detection of torque exceeding the initiation threshold, such that a fixed current is imparted to the input electrical machine 120 during launch routine 330. The power demands of the output electrical machine are prioritised during launch routine 330.

By using the torque sensed during the first control mode to control entry into the launch routine 330, accidental initiation of the output electrical machine can be prevented.

During the launch routine, the current in the input machine is maintained at a minimal level. This effective short-circuit quickly builds up a reaction torque in the input motor-generator 120 against rotation thereof (this build up happens within about 5 to 10 degrees of crank angle). This reaction is transmitted through the epicyclic gear set 140 to the crank arms 50 and pedals 40 and so gives the cyclist something to push against in setting off on the cycle. Furthermore, the one-way clutch ensures the cyclist receives feedback to the effort provided at this stage.

At step 332 of the launch routine 330, the movement of the pedals is again sensed by the sensor 260. The cadence (i.e. the rate of revolution) of the crank arms 50 is determined from the signal sensed thereby, and if this remains below an in-motion threshold the launch routine continues. The in-motion threshold may be, for example, one revolution per second. Once the cadence meets or exceeds the threshold, the method moves to in motion routine 340. In a preferred embodiment, the in-motion threshold may be one revolution per second.

During the in-motion routine 340 the torque is sensed using the input electrical machine 120 at step 341. As referenced above, this occurs during the first control mode of the time division multiplexed control algorithm. The sensed torque is then used to set the current in the input electrical machine 120 during the second control mode at step 342. In particular, the current within the second electrical machine during the second control mode is set to provide a torque output of the input electrical machine 120 which corresponds to the torque sensed during the first control mode.

It should be understood that, by controlling the current in the input motor-generator 120 in this way, the torque on that machine, which is proportional to current, is also controlled. As the input motor-generator 120 is coupled to the crank arms 50 by the epicyclic gear set, controlling the torque in the input motor-generator 120 also controls the torque in the crank arms 50 (the two torques are proportional), which is the torque that the cyclist applies to the crank arms 50 through the pedals 40 when the system is in a steady state. Thus, controlling the current in the input motor-generator 120 determines the force which the cyclist must apply to the pedals 40 to maintain a steady state. Accordingly, in step 342 the current drawn from the input motor-generator 120 so as to cause the pedals 40 to react against the cyclist with a force that gives rise to the cyclist pedaling with the power which the cyclist has indicated she or he wishes to pedal by the position of the power input device.

Controlling the current in this way results in the bicycle 10 automatically changing the transmission ratio between the crank arms 50 and the rear wheel. For example, should the cyclist press on the pedals 40 with more force such that he or she applies torque that exceeds the torque corresponding to the current drawn from the input motor-generator 120 for the determined crank position, the motor-generator "gives way" and so accelerates. This changes the transmission ratio of the epicyclic gear set 140 to change to a lower ratio. Thus, when the torque that the cyclist applies exceeds a certain limit, the arrangement automatically changes to a lower ratio. Thus, the arrangement automatically changes down in conditions when this is needed, such as when climbing a hill or accelerating rapidly.

Similarly, should the cyclist press the pedals 40 with less force and hence apply less torque than the torque that corresponds to the determined current that is to be drawn from the input motor-generator 120, the motor-generator 120 decelerates and resists motion of the crank arms 50 by the cyclist. This deceleration of the input motor-generator 120 again changes the transmission ratio of the epicyclic gear set to a higher ratio. Thus, when the torque that the cyclist applies falls below a certain limit, the arrangement automatically changes to a higher ratio. Thus, the arrangement automatically changes up in conditions when this is needed, such as when going downhill or when easing off and approaching a steady speed from a period of acceleration.

By providing the cyclist with several user-selectable settings of the power input device, the cyclist can select generally the power with which he or she wishes to cycle. Additionally, he or she may change that power whilst cycling so that he or she can cycle generally harder or more easily.

The in-motion routine continues while the bicycle is in motion. This is assessed at step 343, at which a judgement is made as to whether the bicycle is moving. This is done by the ECU 205 sensing the speed of the output motor-generator 110, the speed of the output motor-generator 110 being proportional to the speed of the bicycle 10. The ECU 205 senses the speed of the output motor-generator 110 by receiving a signal indicative of this from motor commutation sensors (although, in other embodiments, the voltage or the frequency of voltage peaks may instead by measured)

If the bicycle is moving, the launch routine continues and the control algorithm alternates between the first and second control modes. That is, in a time divided manner the torque is assessed (step s341; the first control mode) from the input electrical machine and then the current in the input electrical machine is controlled in consequence (step s342; the second control mode). Once the bicycle is detected to be stationary, the output electrical machine is deactivated and the method returns to the start, ready for initiation of the launch routine 330 at a later time.

During the in motion routine, current from the battery is prioritised to the input electrical machine 120 rather than the output electrical machine. This ensures the torque applied by the user and measured during the first control mode is effectively balanced during the second control mode so that the gearing of the system is managed appropriately and the user does not experience unwanted variation in the feedback from the pedals 40. This process can be understood with reference to FIG. 5.

Figure 5:
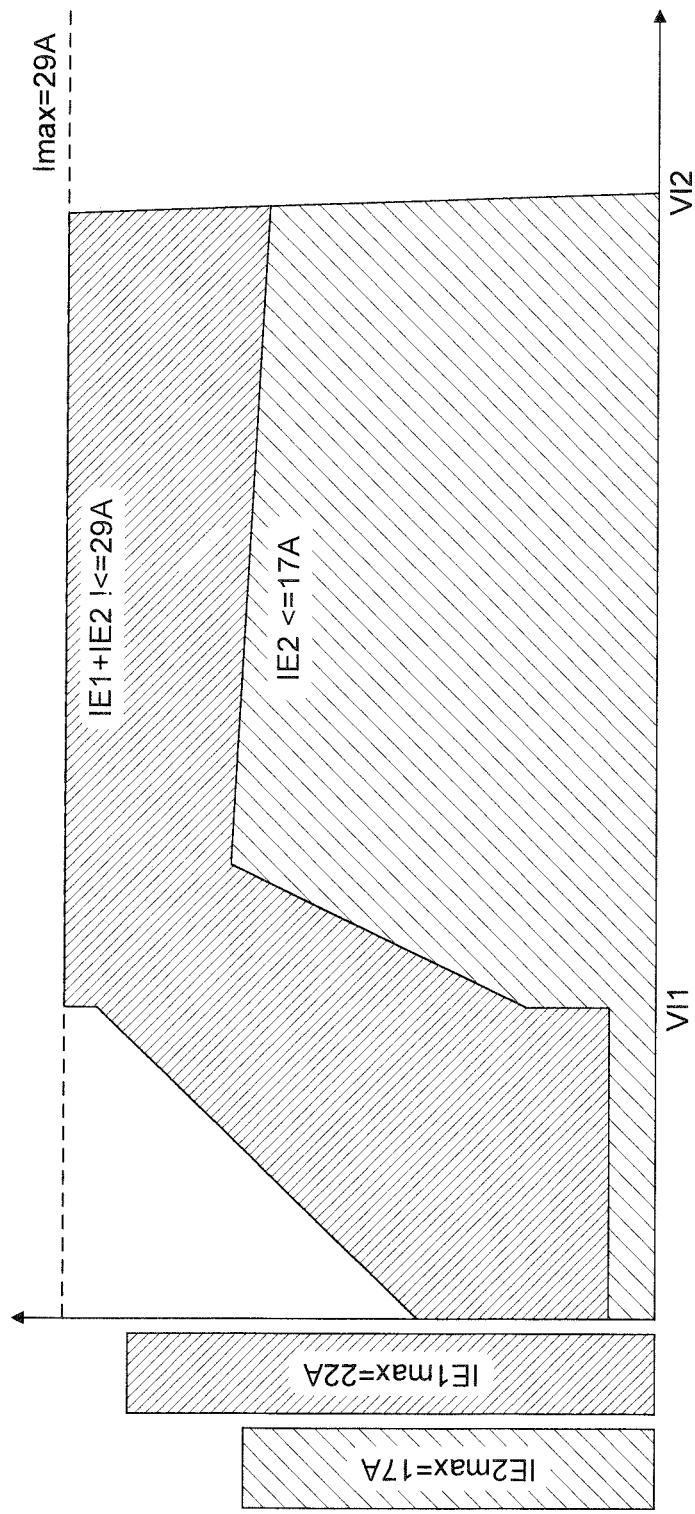
FIG. 5 is an example of a graph illustrating the current applied to an input electrical machine and an output electrical machine during the launch routine and in-motion routine.

In FIG. 5 the horizontal axis represents time. The vertical axis shows current, which is divided between the current applied to the output electrical machine (IE1) and the input electrical machine (IE2). In this latter respect, FIG. 5 illustrates the level of current in the input electrical machine during the second control mode.

In the example of FIG. 5, there is a maximum current, Imax that can be supplied by the battery of 29 A. The output electrical machine has a maximum current, IE1max, of 22 A and the input electrical machine has a maximum current, IE2max, of 17 A. Thus it is not possible for both the input and output electrical machines to be driven at maximum current simultaneously since IE1max+IE2max>Imax. Instead, at all times IE1+IE2<=Imax (i.e. 29 A). There can therefore arise a need to prioritise between the current provided to each electrical machine.

During the in-motion routine, the input electrical machine 120 takes priority for receiving current from battery. The in-motion routine is illustrated in FIG. 5 between times Vl1 and Vl2. As can be seen, in this embodiment, the total current applied to the input electrical machine 120 and the output electrical machine 110 during the in-motion routine is constant (in particular, is fixed at Imax). Of that total, the input electrical machine receives current determined on the basis of the sensed torque, while the output electrical machine receives the remaining available current. In this manner, the current for the input electrical machine 120 is prioritised.

The launch routine is illustrated in the time period prior to Vl1. Here, current for the output electrical machine is prioritised 110, and the input electrical machine 120 only receives a fixed, relatively small current.

Second Embodiment

Figure 6:
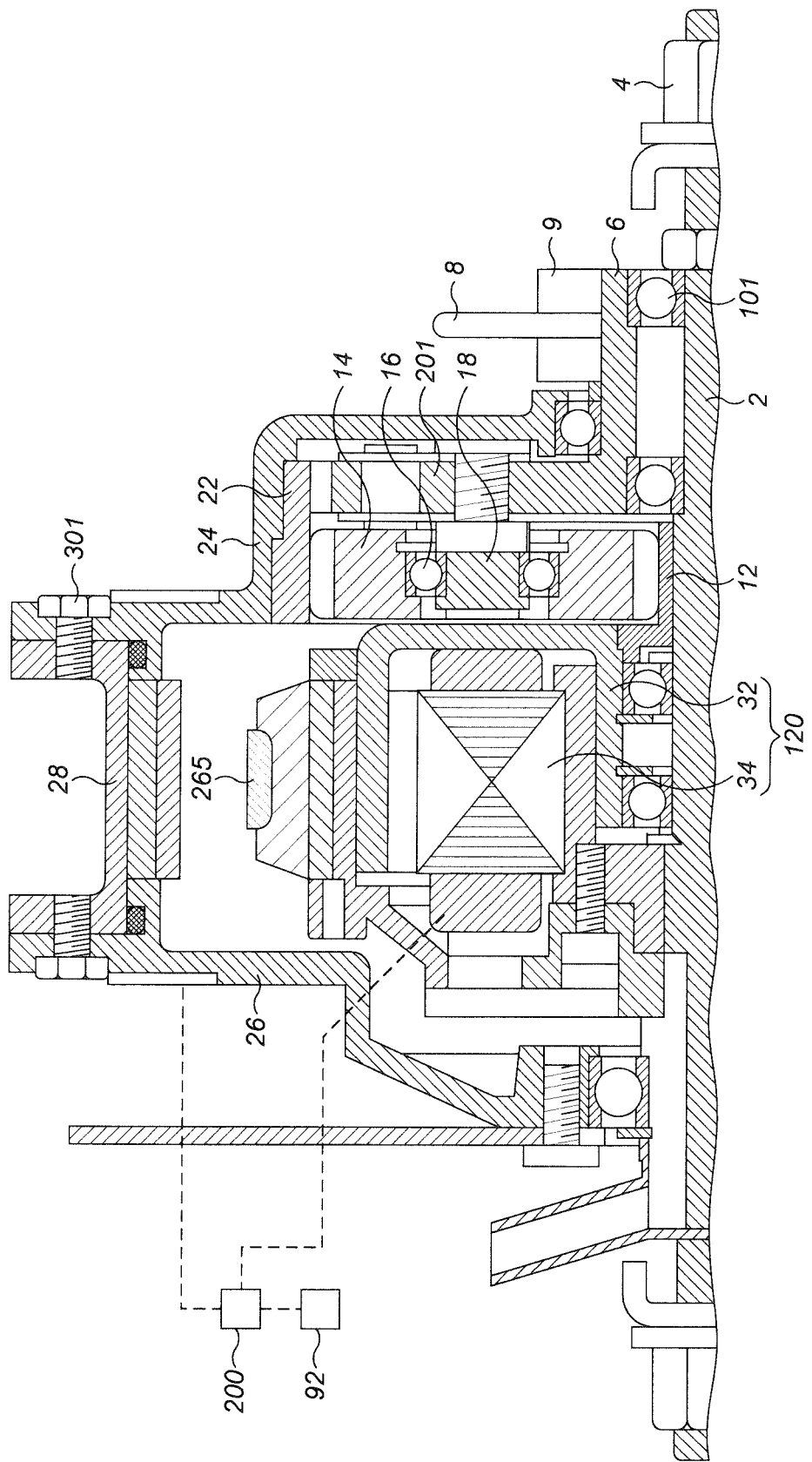
FIG. 6 shows an axial sectional view of the upper half of a bicycle hub according to a second embodiment.

A second embodiment is now described with reference to FIG. 6 onwards. Like reference numerals refer to like features in comparison with the embodiment described with reference to FIGS. 1 to 5.

In the second embodiment, no output electrical machine is provided. Instead, the input electrical machine 120 provides all electrical control to the system. FIG. 6 illustrates the hub 100 in the alternative embodiment in detail.

The features illustrated in FIG. 1 are shared by the first and second embodiments. As for the first embodiment of FIG. 2A, in the second embodiment the hub 100 is mounted on a central shaft 2 which, in use, is fixedly secured to a bicycle frame by means of two nuts 4. The hub includes an annular input member 6, which is connected to a conventional bicycle sprocket wheel 80 via a conventional freewheel mechanism 9, which is not shown in detail. The input member 6 is mounted to rotate about the shaft 2 by a number of bearings 101. The input member 6 is also connected to a single three-branch epicyclic gear set, all three branches or shafts of which rotate. The transmission system includes a sun gear 12, which is mounted to rotate about the shaft 2 and carries teeth in mesh with teeth carried by a number, typically 3, of planet gears 14. The planet gears 14 are rotatably carried by way of bearings 16 by respective planet shafts 18, which are connected to a common carrier 201, which may be formed integrally with the input member 6. The teeth on the planet gears 14 are also in mesh with the teeth on an annulus gear 22, which is fixedly connected to the right-hand portion 24 of a hub housing. The right-hand portion 24 of the hub housing is connected to a left-hand portion 26 by means of a central portion 28. The central portion 28 may be formed integrally with either the right-hand portion 24 or the left-hand portion 26 and coupled to the other of the right-hand portion 24 and left-hand portion with bolts or similar 26. Alternatively, the central portion 28 may be individually formed and is connected to the right- and left-hand portions 24, 26 by means of bolts 301 or similar features.

Accommodated within the hub housing of the second embodiment is a single motor/generator (electrical machine). The motor/generator, or input electrical machine 120, includes a rotor 32 which is connected to rotate with the sun gear 12, and a stator 34. The electrical connections of the stators 34 are connected to a controller 200, which is shown only schematically and is also connected to a rechargeable electric battery 208. The controller 200 is programmed to control the flow of electrical power between the electric battery 208 and the motor/generators in accordance with requirements.

Figure 7:
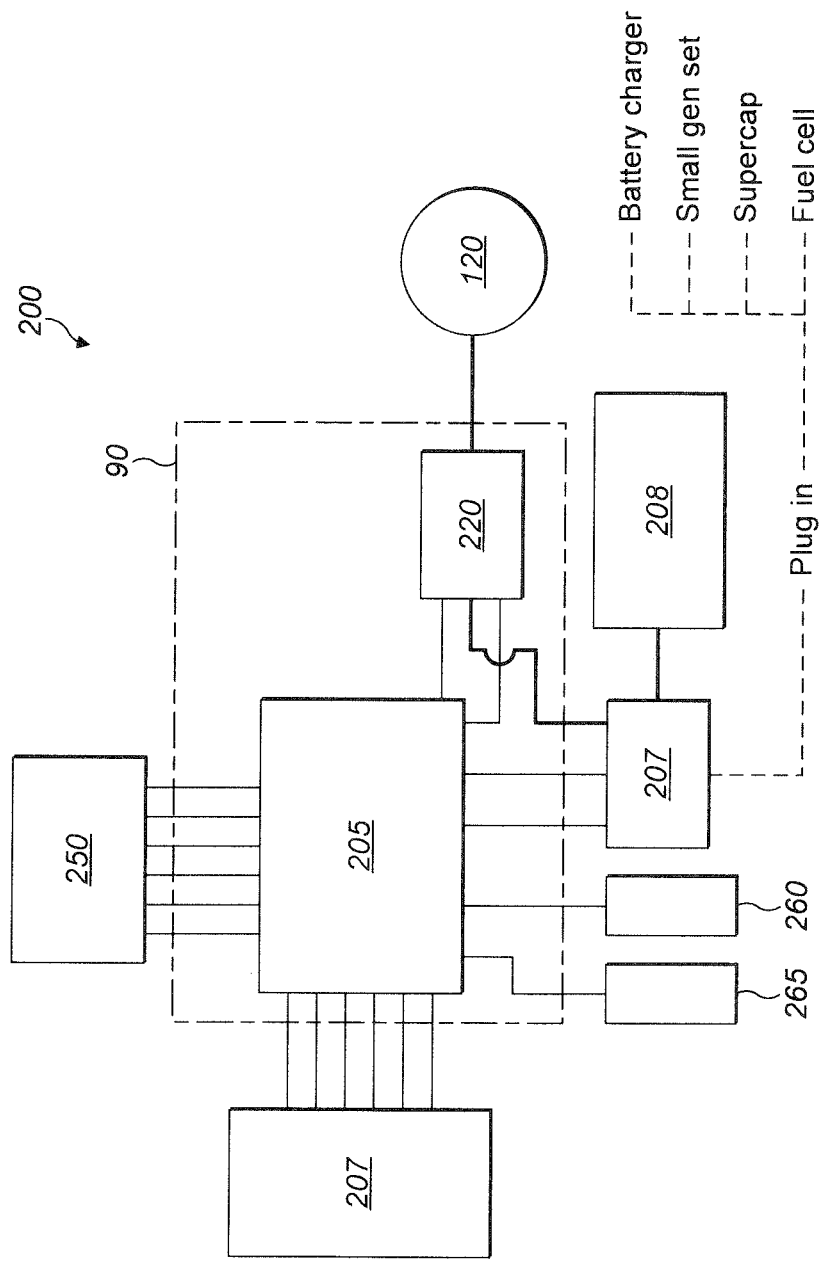
FIG. 7 is schematic representation of control means for controlling operation of the drive arrangement of the second embodiment.

The controller 200 of the second embodiment is illustrated in FIG. 7 and may be arranged in a similar manner to that illustrated in FIG. 3. In particular, the controller 200 may be connected and arranged to control the input motor-generators 120 in response to inputs received from input means. The controller 200 is in the form of an electronic control unit (ECU) 205, a motor-generator controller 220 for controlling the input motor-generator 120. A battery management unit 207 may also be provided with the battery 208. The ECU 205 includes a microprocessor that is programmable and operable to carry out the steps of a method that embodies this invention. The ECU 205 is connected to the input controller 220 and the battery management unit 207 for controlling operation of these units. The motor-generator controller may be a group of MOS and capacitors controlled by the ECU 205 to establish a run-time scheduled bridge.

With reference again to FIG. 1, the ECU 205 and the input controller 220 are housed within a control housing 90 fitted to the frame of the bicycle 10. The battery management unit 207 and the battery 208 are housed within a battery housing 92 that is also fitted to the frame.

The input means that provide inputs to the controller 200 may include user input means 250 and a crank speed and position sensor 260, which may be a number of hall sensors. The user input means 250 includes, in this embodiment, a user-operable power input device and may additionally include a user-operable brake input device (none of which is shown). The power input device is arranged to be operated by a user to indicate generally the power, that is the rate of working, with which he or she wishes to pedal. The brake input device is arranged to be operated by the user to indicate a rate at which the bicycle 10 should be slowed.

An output speed sensor 265, which may be a hall sensor, may be provided to measure the speed at which the bike is moving. The output speed sensor 265 may monitor the front or rear wheel, for example. The output speed sensor 265 provides this information to the controller 200. As illustrated in FIG. 6, the sensor 265 may be embedded in the hub itself. It acts as a high precision sensing system to measure the speed of the rear wheel in this embodiment.

Further features of the controller described above with respect to FIG. 3 may also apply to the controller of the second embodiment.

Although a one way clutch as described with reference to FIG. 2B above may be provided for operation with the second embodiment, in preferred examples an active clutch is additionally or alternatively provided. The active clutch will operate to place the electrical machine into a generator mode at appropriate times, such as when the user desires to brake. The active clutch may be operated by the controller 200, which may respond to information including the speed of the wheels as sensed by sensor 265.

For example, assuming sensor 265 identified that the bike is moving, when the user does not apply pressure to the pedals, the one-way clutch described above or a component of the active clutch may be used to disengage the pedals from the common carrier 201. In addition, in these circumstances the active clutch may act to block movement of the input member 6 around the main shaft 2. As a result, torque is transferred from the annulus gear 22 to the sun gear 12 and thus applied to electrical machine 110, which consequently acts as a generator. This approach may also be applied when it is sensed that the user applies the brakes.

[Operation of the Second Embodiment]

Operation of the bicycle 10 will now be described with reference to FIG. 8. This description will take the form of a description of the steps of a method carried out by the ECU 205 in executing instructions contained in a computer program with which it is programmed.

Figure 8:
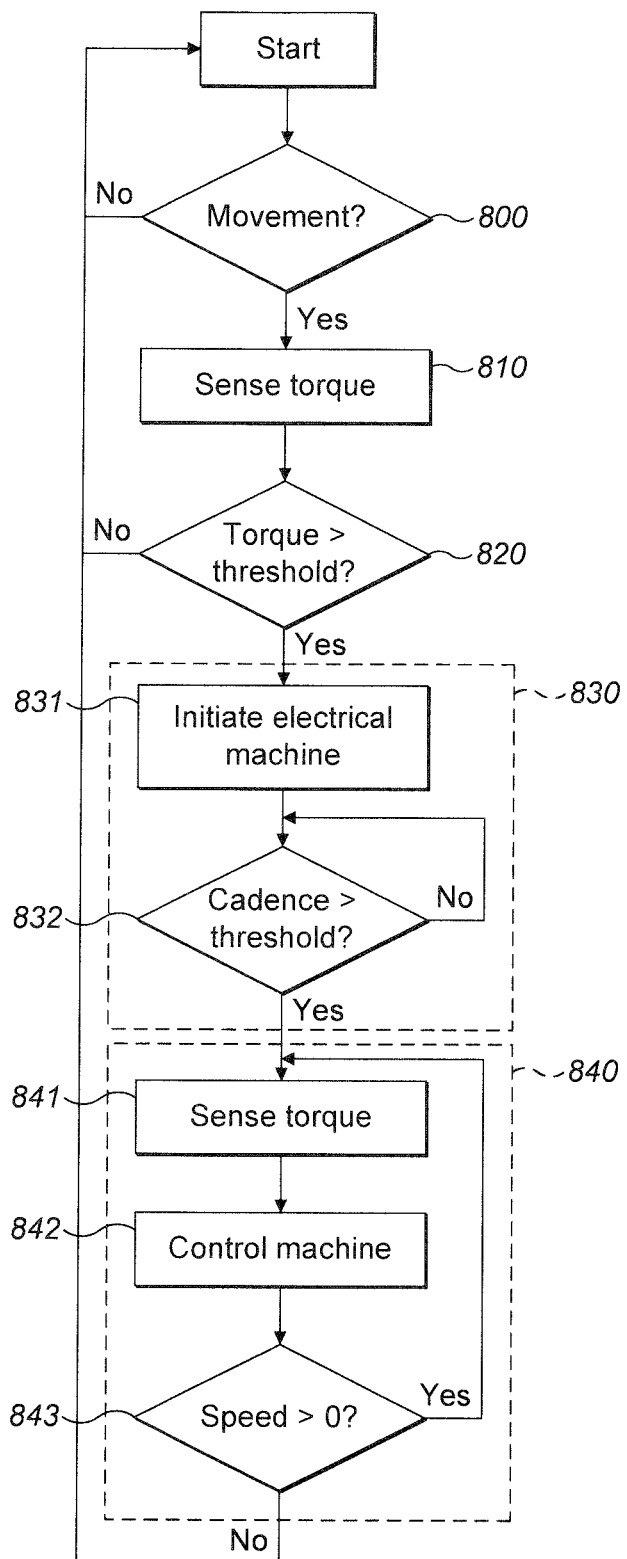
FIG. 8 is a flow diagram of steps of the second embodiment of a method of operating the pedal cycle, the steps including steps of a "launch" routine and an "in-motion" routine.

With reference to FIG. 8, the method begins from a stationary start at step 800 in which the crank speed and position sensor 260 is used to sense movement of the pedals 40. If no movement of the pedals is identified then the method continues to monitor for further events.

If movement of the pedals is identified, the method moves to step 810, wherein the torque applied to pedals 40 is sensed using the input electrical machine 120. The input electrical machine is operated throughout the method according to a time division multiplexed control algorithm to the input electrical machine. The time division multiplexed control algorithm alternates between a first control mode in which current generated by the input electrical machine 120 is monitored to infer torque applied to the crank arms of the cycle and a second control mode in which the current in the input electrical machine 120 is controlled in dependence on the inferred torque. At step 810, the torque is sensed during the first control mode.

At step 820, the controller 200 determines if the torque sensed at step 810 exceeds an initiation threshold. If the torque sensed at step 810 exceeds the initiation threshold, a launch routine 830 is initiated.

During launch routine 830, the input electrical machine 120 is initiated at step 831 in response to the detection of torque exceeding the initiation threshold, such that a fixed current is imparted to the input electrical machine 120 during launch routine 830. By using the torque sensed during the first control mode to control entry into the launch routine 830, accidental initiation can be prevented.

During the launch routine, the current in the input machine is maintained at a minimal level. This effective short-circuit quickly builds up a reaction torque in the input motor-generator 120 against rotation thereof (this build up happens within about 5 to 10 degrees of crank angle). This reaction is transmitted through the epicyclic gear set 140 to the crank arms 50 and pedals 40 and so gives the cyclist something to push against in setting off on the cycle. Furthermore, the one-way clutch ensures the cyclist receives feedback to the effort provided at this stage.

At step 832 of the launch routine 830, the movement of the pedals is again sensed by the sensor 260. The cadence (i.e. the rate of revolution) of the crank arms 50 is determined from the signal sensed thereby, and if this remains below an in-motion threshold the launch routine continues. The in-motion threshold may be, for example, one revolution per second. Once the cadence meets or exceeds the threshold, the method moves to in motion routine 840. In a preferred embodiment, the in-motion threshold may be one revolution per second.

During the in-motion routine 840 the torque is sensed using the input electrical machine 120 at step 841. As referenced above, this occurs during the first control mode of the time division multiplexed control algorithm. The sensed torque is then used to set the current in the input electrical machine 120 during the second control mode at step 842. In particular, the current within the input electrical machine 120 during the second control mode is set to provide a torque output of the input electrical machine 120 which corresponds to the torque sensed during the first control mode.

It should be understood that, by controlling the current in the input motor-generator 120 in this way, the torque on that machine, which is proportional to current, is also controlled. As the input motor-generator 120 is coupled to the crank arms 50 by the epicyclic gear set, controlling the torque in the input motor-generator 120 also controls the torque in the crank arms 50 (the two torques are proportional), which is the torque that the cyclist applies to the crank arms 50 through the pedals 40. Thus, controlling the current in the input motor-generator 120 determines the force which the cyclist must apply to the pedals 40 to maintain a steady state.

Controlling the current in this way results in the bicycle 10 automatically changing the transmission ratio between the crank arms 50 and the rear wheel. For example, should the cyclist press on the pedals 40 with more force such that he or she applies torque that exceeds the torque corresponding to the current drawn from the input motor-generator 120 for the determined crank position, the motor-generator "gives way" and so accelerates. This effect can be used in some embodiments to change the transmission ratio of the epicyclic gear set 140 to change to a lower ratio. Thus, when the torque that the cyclist applies exceeds a certain limit, the arrangement automatically changes to a lower ratio. Thus, the arrangement automatically changes down in conditions when this is needed, such as when climbing a hill or accelerating rapidly.

Similarly, should the cyclist press the pedals 40 with less force and hence apply less torque than the torque that corresponds to the determined current that is to be drawn from the input motor-generator 120, the motor-generator 120 decelerates and resists motion of the crank arms 50 by the cyclist. This deceleration of the input motor-generator 120 can again be used to change the transmission ratio of the epicyclic gear set to a higher ratio. Thus, when the torque that the cyclist applies falls below a certain limit, the arrangement automatically changes to a higher ratio. Thus, the arrangement automatically changes up in conditions when this is needed, such as when going downhill or when easing off and approaching a steady speed from a period of acceleration.

By providing the cyclist with several user-selectable settings of the power input device, the cyclist can select generally the power with which he or she wishes to cycle. Additionally, he or she may change that power whilst cycling so that he or she can cycle generally harder or more easily.

The in-motion routine continues while the bicycle is in motion. This is assessed at step 843, at which a judgement is made as to whether the bicycle is moving. This is done by the ECU 205 sensing the speed as measured by the output speed sensor 265.

If the bicycle is moving, the in-motion routine continues and the control algorithm alternates between the first and second control modes. That is, in a time divided manner the torque is assessed (step s841; the first control mode) from the input electrical machine and then the current in the input electrical machine is controlled in consequence (step s842; the second control mode). Once the bicycle is detected to be stationary, the electrical machine is deactivated and the method returns to the start, ready for initiation of the launch routine 830 at a later time.

This disclosure in some aspects provides a method of operating a pedal cycle, the pedal cycle having an electro-mechanical drive arrangement including a continuously variable ratio transmission system having an input which is mounted to rotate about the axis and an output connected to rotate with a hub member, the transmission system comprising an epicyclic gear set including a sun gear in mesh with a plurality of planet gears mounted to rotate about respective planet shafts carried by a common carrier, which is mounted to rotate with the input about the axis, the planet gears being in mesh with an annulus gear, which is connected to rotate with the hub member, the annulus gear being connected to rotate with a rotor of an output electrical machine or not being connected to rotate with the rotor of the output electrical machine and the sun gear being connected to rotate a rotor of an input electrical machine, the electrical connections of the stators of the one or two electrical machines being connected by a controller which may be arranged to control the transmission of power from one electrical machine to the other; the method including the steps of:

a) operating the input electrical machine as a generator to at least partly power the output electrical machine as a motor in cases where an output electrical machine is provided;

b) applying a time division multiplexed control algorithm to the input electrical machine, wherein the time division multiplexed control algorithm alternates between a first control mode in which current generated by the electrical input machine is monitored to infer torque applied to the crank arms of the cycle and a second control mode in which the current in the input electrical machine is controlled using the inferred torque.

Variations and modifications will be apparent to the skilled person. Such variations and modifications may involve equivalent and other features which are already known and which may be used instead of, or in addition to, features described herein. Features that are described in the context of separate embodiments may be provided in combination in a single embodiment. Conversely, features which are described in the context of a single embodiment may also be provided separately or in any suitable sub-combination.

It should be noted that the term "comprising" does not exclude other elements or steps, the term "a" or "an" does not exclude a plurality, a single feature may fulfil the functions of several features recited in the claims and reference signs in the claims shall not be construed as limiting the scope of the claims. It should also be noted that the Figures are not necessarily to scale; emphasis instead generally being placed upon illustrating the principles of the present invention.

The invention claimed is:

1. A method of operating a pedal cycle, the pedal cycle having crank arms and an electro-mechanical drive arrangement including a continuously variable ratio transmission system having an input which is mounted to rotate about an axis and an output connected to rotate with a hub member, the transmission system comprising an epicyclic gear set including a sun gear in mesh with a plurality of planet gears mounted to rotate about respective planet shafts carried by a common carrier, which is mounted to rotate with the input about the axis, the planet gears being in mesh with an annulus gear, which is connected to rotate with the hub member, the annulus gear being connected to rotate with a rotor of an output electrical machine and the sun gear being connected to rotate a rotor of an input electrical machine, an electrical connection of a stator of the output electrical machine and an electrical connection of a stator of the input electrical machine being connected by a controller arranged to control the transmission of power from one electrical machine to the other; the method including the steps of:

a) operating the input electrical machine as a generator to at least partly power the output electrical machine as a motor;
b) applying a time division multiplexed control algorithm to the input electrical machine, wherein the time division multiplexed control algorithm alternates between a first control mode in which a current generated by the electrical input machine is monitored to infer torque applied to the crank arms of the cycle and a second control mode in which the current in the input electrical machine is controlled using the inferred torque.

2. The method of claim 1, further comprising initiating operation of the output electrical machine as a motor when the inferred torque exceeds a threshold value.

3. The method of claim 1, wherein the control of the current applied to the input electrical machine in response to the inferred torque during the second control mode is dependent upon whether the pedal cycle is in a launch routine or an in-motion routine.

4. The method of claim 3, wherein the input electrical machine and the output electrical machine are coupled to an electrical power source, and wherein during the launch routine the output electrical machine takes priority over the input electrical machine for receiving current from the electrical power source during the second control mode.

5. The method of claim 3, wherein the input electrical machine and the output electrical machine are coupled to an electrical power source, and wherein during the in motion routine the input electrical machine takes priority over the output electrical machine for receiving current from the electrical power source during the second control mode.

6. The method of claim 1, wherein the current in the input electrical machine during the second control mode is calculated to match the inferred torque identified during the first control mode.

7. The method of claim 6, wherein the current in the input electrical machine during the second control mode is controlled to lie in a range between a maximum current and a minimum current, the maximum and minimum currents being calculated using the inferred torque.

8. The method of claim 1, further comprising supplying substantially all electrical energy generated by one of the input and output electrical machine to the other of the input and output electrical machine to operate that other electrical machine as a motor.

9. The method of claim 1, further comprising determining that the pedal cycle or the crank arms are substantially stationary and, in response thereto, substantially short-circuiting the input electrical machine.

10. The method of claim 9, further comprising maintaining the substantial short-circuiting of the input electrical machine until the current in the input electrical machine reaches the maximum current.

11. The method of claim 1, wherein a one-way clutch, which includes a drive member, which is constituted by the common carrier, and a driven member, which is connected to rotate with the hub members, the one-way clutch being arranged to connect the hub member to rotate with the common carrier as soon as the common carrier rotates faster than the hub member.

12. The method of claim 1, wherein a one-way clutch is adapted to connect the hub member to rotate with the common carrier.

13. A pedal cycle having crank arms and an electro-mechanical drive arrangement including a continuously variable ratio transmission system comprising:

an input which is mounted to rotate about an axis;
an output connected to rotate with a hub member;
an epicyclic gear set including a sun gear in mesh with a plurality of planet gears mounted to rotate about respective planet shafts carried by a common carrier, which is mounted to rotate with the input about the axis, the planet gears being in mesh with an annulus gear, which is connected to rotate with the hub member;
the annulus gear being connected to rotate with a rotor of an output electrical machine and the sun gear being connected to rotate a rotor of an input electrical machine, the electrical connection of a stator of the output electrical machine and the connection of a stator of the input electrical machine being connected by a controller arranged to control the transmission of power from one electrical machine to the other by:
a) operating the input electrical machine as a generator to at least partly power the output electrical machine as a motor;
b) applying a time division multiplexed control algorithm to the input electrical machine, wherein the time division multiplexed control algorithm alternates between a first control mode in which a current generated by the electrical input machine is monitored to infer torque applied to the crank arms of the pedal cycle and a second control mode in which the current in the input electrical machine is controlled using the inferred torque.

14. The pedal cycle of claim 13, wherein the controller initiates operation of the output electrical machine as a motor when the inferred torque exceeds a threshold value.

15. The pedal cycle of claim 13, wherein the controller controls the current applied to the input electrical machine in response to the inferred torque during the second control mode dependent upon whether the pedal cycle is in a launch routine or an in-motion routine.

16. The pedal cycle of claim 15, wherein the input electrical machine and the output electrical machine are coupled to an electrical power source, and wherein during the launch routine the output electrical machine takes priority over the input electrical machine for receiving a current from the electrical power source during the second control mode.

17. The pedal cycle of claim 15, wherein the input electrical machine and the output electrical machine are coupled to an electrical power source, and wherein during the in motion routine the input electrical machine takes priority over the output electrical machine for receiving a current from the electrical power source during the second control mode.

18. The pedal cycle of claim 13, wherein the controller calculates a current in the input electrical machine during the second control mode to match the inferred torque identified during the first control mode.

19. The pedal cycle of claim 18, wherein the controller controls the current in the input electrical machine during the second control mode is to lie in a range between a maximum current and a minimum current, the maximum and minimum currents being calculated using the inferred torque.

20. The pedal cycle of claim 13, wherein the controller applies control so that substantially all electrical energy generated by one of the input and output electrical machine is supplied to the other of the input and output electrical machine to operate that other electrical machine as a motor.

21. The pedal cycle of claim 13, wherein the controller carries out the step of determining that the pedal cycle or the crank arms are substantially stationary and, in response thereto, substantially short-circuits the input electrical machine.

22. The pedal cycle of claim 21, wherein the controller carries out the step of maintaining the substantial short-circuiting of the input electrical machine until the actual current in the input electrical machine reaches the maximum current.

23. The pedal cycle of claim 13, further including a one-way clutch, which includes a drive member, which is constituted by the common carrier, and a driven member, which is connected to rotate with the hub members, the one-way clutch being arranged to connect the hub member to rotate with the common carrier as soon as the common carrier rotates faster than the hub member.

24. The pedal cycle of claim 13, further comprising a one-way clutch adapted to connect the hub member to rotate with the common carrier.

\* \* \* \* \*